Patented Apr. 7, 1936

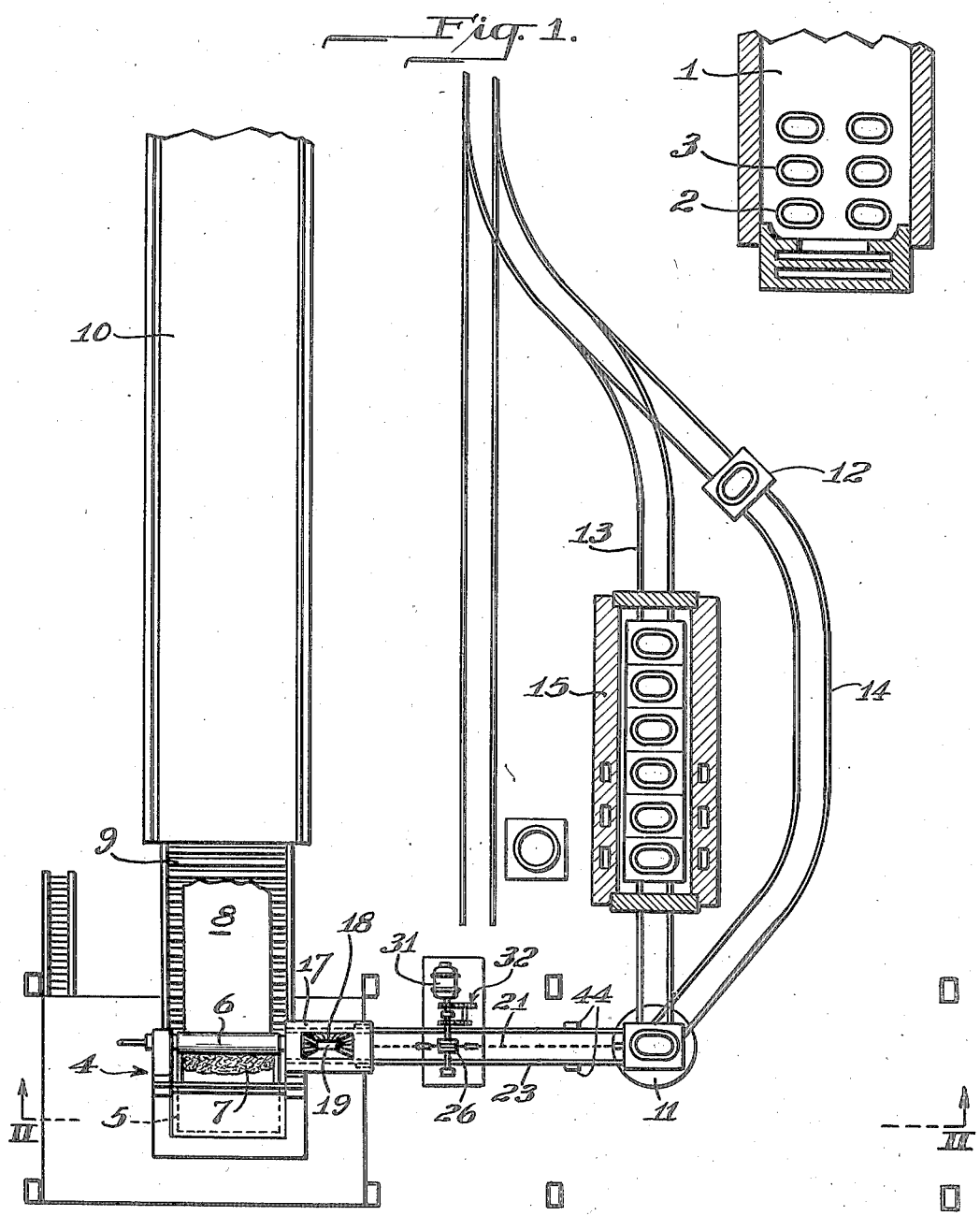

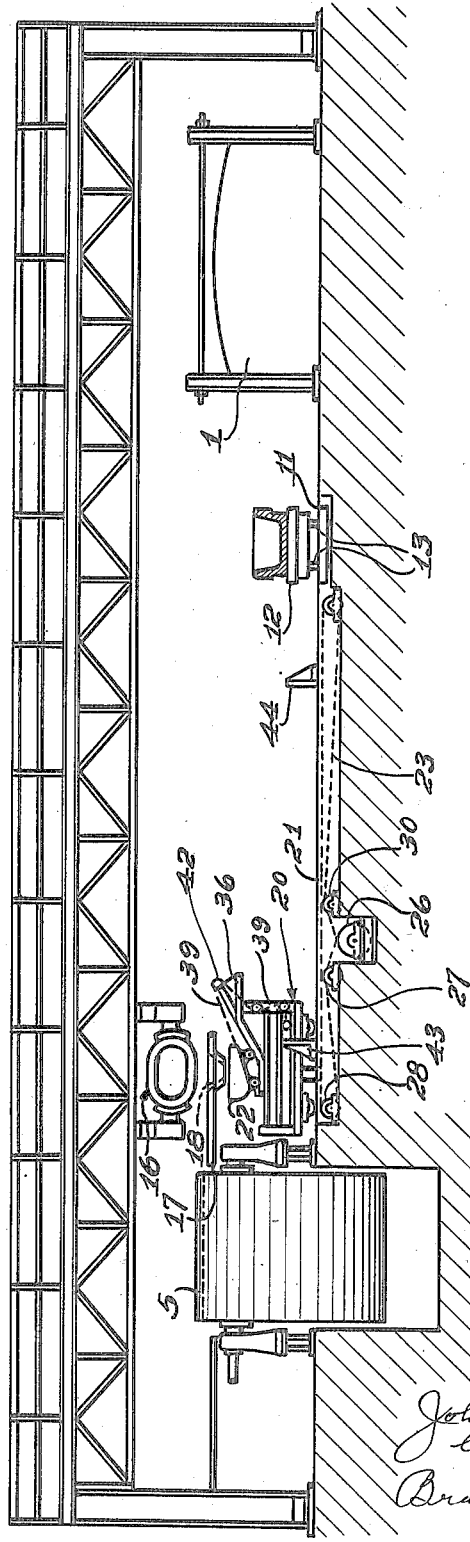

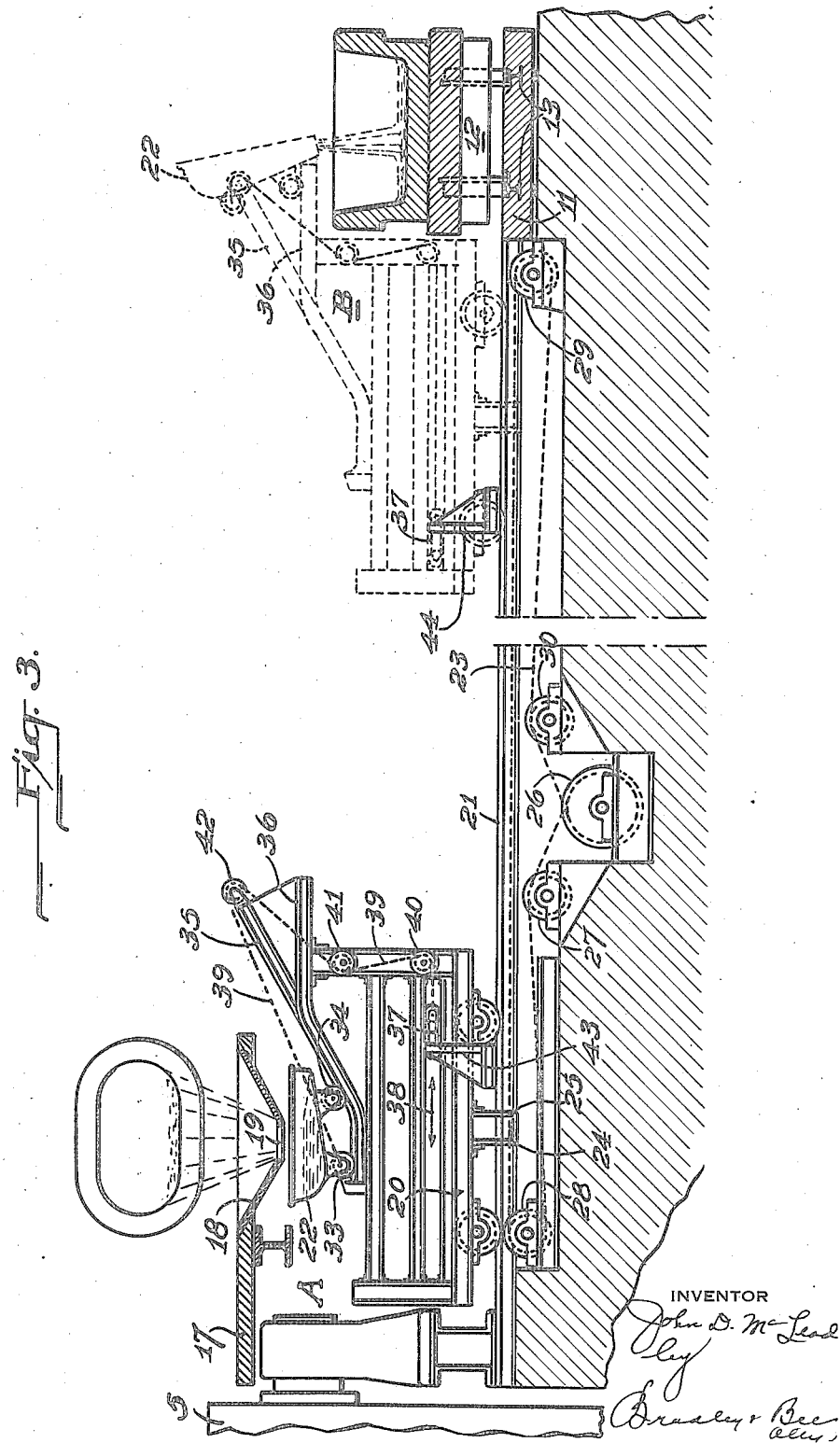

2,036,228

UNITED STATES PATENT OFFICE 2,036,228

PLATE GLASS CASTING APPARATUS

John D. McLeod, Oakmont, Pa., assignor to Pittsburgh Plate Glass Company, a corporation of Pennsylvania Application June 21, 1933, Serial No. 676,865

4 Claims. (Cl. 49—3)

The invention relates to a plate glass casting process and apparatus and particularly to an operation involving the use of pots and to the handling of the waste glass left after the teeming or pouring operation shown and described in my prior application, Serial No. 481,447. The invention is illustrated in connection with casting apparatus, such as that of the Showers Patent No. 1,579,666, in which the glass is teemed between rolls which form it into a sheet, but is not limited to use with this particular form of sheet forming apparatus. The invention has for its principal objects the provision of an improved process and apparatus whereby the labor of taking care of the waste glass left after teeming and returning it to service is reduced to a minimum, and whereby such waste glass is kept clean and free from contamination of any kind during the interim which elapses between its discharge from the pot and its return to the furnace for remelting. Heretofore, it has been the custom after the teeming or casting operation to dump the excess glass remaining in the pot after casting on the floor or into a bin, from which it was transferred from time to time to the cullet bin. The cullet thus accumulated in the cullet bin was supplied to the pots as required with the necessary amount of batch for each new melt. In the practice of the present invention, the excess or waste glass left in the pot after casting is deposited into a movable container or bucket mounted for movement back and forth from a position adjacent the point of casting to a station along the line of the return movement of the pot, and at such station, the glass is dumped from the bucket back into the pot preliminary to the next melt. The pot is thus supplied with a part of the cullet required for the next melt, additional cullet and batch being added in the usual way after the pot is placed in the furnace.

One form of the improved apparatus for carrying out the process is shown in the accompanying drawings, wherein:

Figure 1 is a plan view of the complete apparatus. Fig. 2 is a section on the line II—II of Fig. 1. And Fig. 3 is an enlarged partial section on the line II—II of Fig. 1.

Referring to the general arrangement as shown in Figs. 1 and 2, 1 is a pot furnace of ordinary construction adapted to melt the contents of the series of pots 2, 3, etc. preliminary to casting. 4 is the casting apparatus similar to that of the Showers patent heretofore referred to and comprising a large ring roller 5 and a smaller sizing roller 6, between which the body of glass 7 is poured, suitable means not shown being employed to rotate the rolls so as to form the sheet 8. This sheet passes over the roller apron 9 and into the roller leer 10, all of which construction is well-known in the art. The pots are carried from the furnace 1 to a station 11, not far from the casting apparatus on trucks 12 running on the tracks 13 and 14. The track 13 passes through a tunnel kiln 15 in which a number of pots may be stored at one time and the temperature of the glass brought to uniform temperature, this apparatus being often referred to as a "soaking kiln." The track 14 constitutes the return track for the trucks and pots carried thereby.

In operation, a pot is removed from the furnace 1 and placed on a truck on the track 13 by means of a suitable crane. This truck is then moved along the track and through the soaking kiln 15 to the station 11. At this point the pot is removed from the truck and carried by means of an overhead teeming crane 16 to a position above the rolls 5 and 6. The glass in the pot is now teemed between the rolls by tilting it and pouring into the space between the rolls as the crane moves longitudinally of such rolls. In the apparatus as shown, the pouring into the space between the rolls begins at the left-hand end thereof (Fig. 1) and the crane moves to the right pouring the glass into the elongated body 7 until the contents of the pot is practically exhausted. The movement of the pot to the right is now continued so that the excess glass left in the pot is deposited upon the platform 17 and in the hopper 18 shown in Fig. 3, such hopper having an opening at 19 to permit the glass to discharge downward therethrough. Only a slight amount of glass is deposited on the platform 17, the main discharge occurring into the hopper and the glass which discharges upon the platform is pushed into the hopper by a workman using a hand tool before such glass becomes completely solidified. The pot is now moved back again to the station 11 and deposited upon its truck, at which point it is left until the glass which was deposited in the hopper 18 can be transferred to the pot.

The transfer of glass from the hopper 18 to the pot at the station 11 is accomplished by means of the truck 20 mounted on the track 21 and the container 22 which is mounted for movement on the truck and which occupies the position shown in Fig. 3 when the pot is discharging into the hopper. The truck 20 is moved from its left-hand position as shown in Fig. 3 to its right-hand position by means of a cable 23 attached at its two ends 24 and 25 to the truck and passing around the drum 26 and the pulleys 27, 28, 29 and 30. The drum 26 is rotated to move the car or truck by means of the motor 31 operating through the reduction gearing 32. The operator by means of a control switch governs the movement of the truck from one position to the other. The container 22 is provided with two rear wheels 33 and two front wheels 34 working upon the outside tracks 35 and the inside tracks 36 respectively. The inside track 36 has its upper portion extended horizontally so that when the container arrives at the position indicated at the right-hand side of Fig. 3, it is tilted so as to discharge its contents into the pot on the truck 12 at the station 11. When the container is moved from this position to the lower end of the tracks, it resumes its position as shown at the left-hand side of Fig. 3. The movement of the container between its two positions is accomplished by means of a cross head 37 mounted for movement longitudinally of the truck in the guideway 38 and the two cables 39 each secured at one end of the cross head and at the other end to the side of the container, such cables passing over the pulleys 40, 41, and 42. The movement of the cross head between its two extreme positions at the opposite end of the truck is accomplished by means of the pairs of stops 43 and 44. When the truck moves from its position A at the left of Fig. 3 to its position B at the right of such figure, the cross head 37 engages the stops 44 and moves the container to its upper position as shown, where it tilts, discharging the glass therein to the pot beneath. When the truck moves back from position B to position A, the stops 43 engage the cross head 37 and the container is allowed to move down by gravity to its lower receiving position as indicated at the left of Fig. 3. After the contents of the container has been placed in the pot at station 11, the truck is moved back along the track 14 to a point opposite the furnace 1 and the pot and its contents transferred by means of the crane to the furnace for another melting operation. Additional batch and cullet are then added in the usual way in order to provide the necessary material for a complete melt. This completes the cycle, the casting operation being timed to occur at about seven-minute intervals, and a new pot being transferred from the soaking kiln 15 to the station 11 after the empty pot at station 11 has received the glass from the container 22 and is moved out of the way along the track 14.

What I claim is:

1. In combination in plate glass making apparatus including a pot furnace, melting pots, a casting apparatus and transfer means for moving the pots back and forth between the furnace and casting apparatus and for carrying a pot over the casting apparatus and tilting it, a truck mounted for movement between the casting apparatus and a station along the line of travel of the pots from the furnace to the casting apparatus, a container on the truck lying below the casting level of said casting apparatus and adjacent to the side thereof when the truck is in its position adjacent the casting apparatus, and means on the truck for moving the container to a higher level on the truck than its receiving position and tilting it to cause it to discharge by gravity after the truck has been moved to said station.

2. In combination in plate glass making apparatus including a pot furnace, melting pots, a casting apparatus and transfer means for moving the pots back and forth between the furnace and casting apparatus and for carrying a pot over the casting apparatus and tilting it, a truck mounted for movement between the casting apparatus and a station along the line of travel of the pots from the furnace to the casting apparatus, a container on the truck lying below the casting level of said casting apparatus and adjacent to the side thereof when the truck is in its position adjacent the casting apparatus, and means on the truck operated by the movement thereof for moving the container to a higher level on the truck than its receiving position and tilting it so as to discharge its contents when the truck reaches said station.

3. In combination in plate glass making apparatus including a pot furnace, melting pots, a casting apparatus and transfer means for moving the pots back and forth between the furnace and casting apparatus and for carrying a pot over the casting apparatus and tilting it, a hopper at one side of the casting apparatus open at its lower end, a container mounted for movement from a position beneath said hopper to a discharge station along the line of movement of the pots between the casting apparatus and furnace above the top of the pots, means for moving the container back and forth between said position and said station, and means for tilting the container to cause it to discharge into a pot when it reaches said station.

4. In combination in plate glass making apparatus including a pot furnace, melting pots, a casting apparatus and transfer means for moving the pots back and forth between the furnace and casting apparatus and for carrying a pot over the casting apparatus and tilting it, a truck mounted for movement between the casting apparatus and a station along the line of travel of the pots from the furnace to the casting apparatus, a container on the truck lying below the casting level of said casting apparatus and adjacent the casting apparatus, means on the truck operated by the movement thereof for moving the container to a higher level on the truck than its receiving position and tilting it so as to discharge its contents when the truck reaches said station and means operated by the movement of the truck for causing the container to move back to its receiving position during the movement of the truck back to its receiving position adjacent to casting apparatus.

JOHN D. McLEOD.